Patented Mar. 27, 1951

2,546,207

UNITED STATES PATENT OFFICE 2,546,207

SUSPENSION POLYMERIZATION

David Bandel, Brooklyn, N. Y., assignor to Mathieson Chemical Corporation, a corporation of Virginia No Drawing. Application August 18, 1949, Serial No. 111,080

4 Claims. (Cl. 260—45.5)

My invention is concerned with polymerization reactions and more particularly relates to a method of effecting the polymerization of various monomers or monomeric mixtures in aqueous suspension.

Polymerization in aqueous suspension has numerous advantages over other methods, especially in the case of temperature control and in the form in which the polymer product is produced. The method has been applied with excellent results in the polymerization of styrene, for example. However, it has not been generally used in the polymerization of monomers of high density because the product obtained is normally agglomerated and occluded. This follows from the fact that the conventional suspending agents are inadequate with respect to monomers of high density, particularly in that they do not prevent the premature settling of unreacted or partially reacted monomer. Attempts have been made to increase the density of the aqueous medium by dissolving salts, sugars and the like therein, but these attempts have not led to satisfactory results. Indeed, the addition of such materials has been found detrimental as necessitating even more extensive after-treatment of the polymer.

I have now invented a suspending agent which when applied in the polymerization of high density monomers in aqueous suspension avoids agglomeration of the polymer product and the consequent occlusion therein of water and other components of the suspension mixture. My suspending agent is a sodium salt of a copolymer of nuclear dichlorostyrene and methacrylic acid combining from 10 to 50% of dichlorostyrene with from 50 to 90% of methacrylic acid. I customarily prepare the salt by dissolving the copolymer in a normal solution of sodium hydroxide, which is best heated to facilitate solution of the copolymer. Normally, the relative proportions of copolymer and caustic employed are such that the solution is quite thick or viscous. In the practice of my invention, I have found it convenient to use the salt in the form of a 1% solution prepared by dilution of the thick solution with water.

Copolymers of dichlorostyrene and methacrylic acid are readily produced by heating the monomers in a sealed tube at about 60° C. for a period which varies depending on the relative proportions of the two monomers. In preparing the copolymer I may use either individual nuclear dichlorostyrenes or mixtures containing any two or more of the six possible isomers. In my experimental work, I have used, with advantage, a mixture containing all of the isomers but predominating in the isomers in which the two chlorine atoms stand in non-adjacent relation on the benzene nucleus, e. g., 2,4-dichlorostyrene and 2,5-dichlorostyrene. The preferred copolymer for use in preparing the salt combines from 30 to 40% dichlorostyrene with from 60 to 70% methacrylic acid.

My suspending agent is applied with particular advantage in the suspension polymerization of monomers and monomeric mixtures having densities within the range 1.1 to 1.3, e. g., nuclear dichlorostyrenes, but it is not so limited in application, being applicable to the suspension polymerization of various other polymerizable materials and mixtures thereof. Thus, excellent results are obtained using my suspending agent in the suspension polymerization of methyl methacrylate, for example.

The amount of the polymer salt which is included in the suspension mixture varies depending upon the particular monomer or monomers to be polymerized and other factors including the presence or absence of modifiers, the rate of agitation of the suspension mass, the size of the batch, etc. However, the amount used is always sufficient to maintain the monomeric material evenly dispersed in the suspension medium throughout the reaction. In general, about 0.05 to 5 grams of my suspending agent may be used per 100 grams of monomers. Usually about 0.1 to 1 gram per 100 grams of monomers is satisfactory.

My invention is illustrated by the following comparative examples which are not to be taken as in any way limiting the scope thereof:

Example I

A mixture of about 60% by volume of methacrylic acid and 40% by volume of mixed isomeric nuclear dichlorostyrenes to which was added 0.1% of benzoyl peroxide, was polymerized by heating in a sealed tube at 60° C. for several hours. The resulting copolymer was ground and dissolved in hot 1 N. NaOH using 10 ml. of the caustic solution per gram of copolymer. When the copolymer had dissolved to a very thick clear solution, it was diluted to form a 1% stock solution.

Example II 50 ml. of mixed isomeric nuclear dichlorostyrenes containing 0.5 g. of benzoyl peroxide dissolved therein was added with agitation to 400 ml. of water to which had been added 10 ml. of the stock solution of Example I. The pH of the resulting mixture was 7.8. On polymerizing at 80° C. for 7 hours, while continuing the agitation, very satisfactory large, clear beads were obtained. No emulsification occurred.

When the above experiment was repeated omitting the polymer salt, emulsification occurred, resulting in the entrainment in the polymer product of objectionably large quantities of water. Furthermore, the particles were ovoid in shape indicating that considerable coalescence had occurred.

Analogous materials gave unsatisfactory results as suspending agents. Thus, in one experiment 100 ml. of the same mixed isomeric nuclear dichlorostyrenes containing 0.1 g. of benzoyl peroxides were dispersed in 350 ml. of water containing 20 ml. of a 5% solution of sodium polymethacrylate. On polymerizing with agitation for several hours at 82° C., the product was an agglomerated mass of no value.

Agglomeration also resulted when 100 ml. of mixed dichlorostryrenes containing 1 g. of benzoyl peroxide were added to 350 ml. of water containing 20 ml. of a 5% sodium polymethacrylate solution and 25 ml. of a 0.1 M sodium dihydrogen phosphate solution. The pH of this mixture was approximately 6.

In a still further experiment, 100 ml. of mixed nuclear dichlorostyrenes containing 1 g. of benzoyl peroxide were added to a mixture of 350 ml. of water, 20 ml. of a 5% solution of sodium polymethacrylate, 15 ml. of 0.1 M sodium dihydrogen phosphate and 25 ml. of a 0.1 M disodium hydrogen phosphate solution. The resulting mixture, having a pH of about 4.9 was stirred at 68° C. for eighteen hours. The polymer was obtained in large ovoid opalescent particles, instead of in the desirable bead form.

*Example III*

70 ml. of methyl methacrylate containing 0.14 g. of benzoyl peroxide was dispersed in a solution made up of 700 ml. of water containing 0.7 g. of the sodium salt of a 70% methacrylic acid-30% nuclear dichlorostyrene copolymer. On agitating the mixture at 82° C. for six hours, fine beads were obtained with only a very slight amount of agglomeration.

The experiment was repeated except that half as much benzoyl peroxide and twice as much of the suspending agent, namely, 1.4 grams were used. Excellent beads were obtained.

In another experiment 100 ml. of methyl methacrylate containing 0.2 g. of benzoyl peroxide was added to a solution prepared from 700 ml. of water and 2.1 g. of the polymer salt. After agitating for six hours at 82° C. with nitrogen displacing the air above the solution, fine beads were obtained.

A larger experiment similar to the preceding one involved the addition of 300 ml. of methyl methacrylate containing 0.6 g. of benzoyl peroxide to a solution prepared from 2100 ml. of water and 4.2 g. of the polymer salt. The pH of this suspension was about 6.9. After six hours of agitation at 82° C. an excellent yield of fine beads was obtained.

*Example IV*

A copolymer of nuclear dichlorostyrenes and acrylonitrile was prepared by the addition of 35 ml. of mixed nuclear dichlorostyrenes and 15 ml. acrylonitrile containing 0.1 g. of benzoyl peroxide to a solution prepared from 400 ml. of water and 0.1 g. of the sodium salt of a 60% methacrylic acid-40% nuclear dichlorostyrene copolymer. The pH of the suspension mixture was about 7.8. After agitation for about 20 hours at 65° C., very uniform beads having a diameter of 1 to 2 millimeters were obtained.

In a second experiment, a copolymer of nuclear dichlorostyrenes and acrylonitrile was prepared by the addition of a mixture of 180 ml. of dichlorostyrene and 120 ml. of acrylonitrile containing dissolved therein 0.321 g. of benzoyl peroxide to a solution prepared from 2000 ml. of water and 1 g. of the same sodium salt. The suspension had a pH of about 7.7. After agitation for 23 hours at 65° C., an excellent product in the form of very fine beads was obtained.

Other suspending agents were generally unsatisfactory in the suspension copolymerization of these monomers. Thus, pronounced agglomeration occurred in the case of a mixture of 70 ml. of mixed nuclear dichlorostyrenes, 30 ml. of acrylonitrile, 0.11 g. of benzoyl peroxide, 400 ml. of water, 10 g. of magnesium carbonate and 3 grams of sodium bicarbonate. The result was the same in the use of a mixture of 35 ml. of mixed nuclear dichlorostyrenes, 15 ml. of acrylonitrile, 0.56 g. of benzoyl peroxide, 450 ml. of water and 50 ml. of a 1% solution of methyl cellulose.

Buffering of the latter mixture at a pH of 6.4 with $NaH_2PO_4$-$Na_2HPO_4$ buffer, did not prevent agglomeration.

An agglomerated emulsion resulted when an attempt was made to polymerize a monomeric mixture consisting of 35 ml. of mixed nuclear dichlorostyrenes and 35 ml. of acrylonitrile containing 0.056 g. of benzoyl peroxide in 350 ml. of water to which had been added 25 ml. of a saturated solution of a sulphated fatty acid ester. Substituting 375 ml. of a glucose solution having a specific gravity of 1.204 for the water did not help.

The addition of 5 ml. of a 5% solution of dioctyl sodium sulfosuccinate resulted in the agglomeration during polymerization of a mixture of 35 ml. of nuclear dichlorostyrene and 15 ml. of acrylonitrile containing 0.056 g. of benzoyl peroxide in 400 ml. of water.

I claim:

1. In the process of polymerizing in aqueous suspension a monomeric material selected from the class consisting of nuclear dichlorostyrenes, acrylonitrile and methyl methacrylate, the step of inhibiting agglomeration of resultant polymer particles which comprises including in the suspension mixture before polymerization a sodium salt of a copolymer of nuclear dichlorostyrene and methacrylic acid combining from 10 to 50% of nuclear dichlorostyrene and 50 to 90% of methacrylic acid, the amount of the salt being sufficient to prevent substantial agglomeration and occlusion of the polymer product.

2. In the process of polymerizing nuclear dichlorostyrene in aqueous suspension, the step of inhibiting agglomeration of resultant polymer particles which comprises including in the suspension mixture before polymerization a sodium salt of a copolymer of nuclear dichlorostyrene and methacrylic acid combining from 30 to 40% of dichlorostyrene and from 60 to 70% of methacrylic acid, the amount of the salt being sufficient to prevent substantial agglomeration and occlusion of the polymer product.

3. In the process of copolymerizing nuclear dichlorostyrene and acrylonitrile in aqueous suspension, the step of inhibiting agglomeration of resultant polymer particles which comprises including in the suspension mixture before polymerization a sodium salt of a copolymer of nuclear dichlorostyrene and methacrylic acid, combining from 30 to 40% of dichlorostyrene and 60 to 70% of methacrylic acid, the amount of salt being sufficient to prevent substantial agglomeration and occlusion of the polymer product.

4. In the process of polymerizing methyl methacrylate in aqueous suspension, the step of inhibiting the agglomeration of resultant polymer particles which comprises including in the suspension mixture before polymerization a sodium salt of a copolymer of nuclear dichlorostyrene and methacrylic acid combining 30 to 40% of dichlorostyrene and 60 to 70% of methacrylic acid, the amount of the salt being sufficient to prevent substantial agglomeration and occlusion of the polymer product.

DAVID BANDEL.

No references cited.